No. 643,890. Patented Feb. 20, 1900.
A. E. BURNOUF.
ROLLER BEARING.
(Application filed Aug. 8, 1899.)
(No Model.)
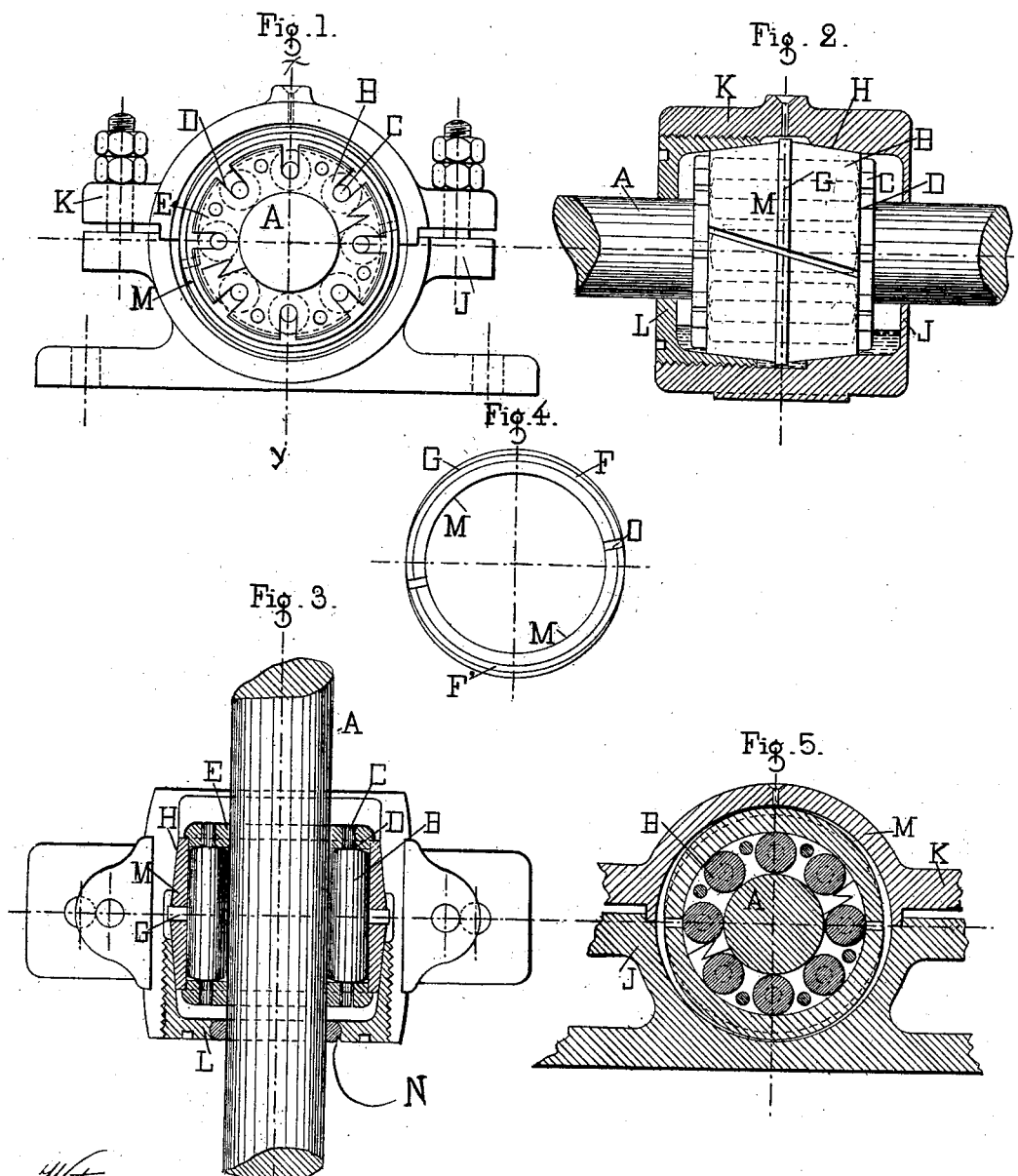
Witnesses:
John Buckler,
C. C. Olsen.
Inventor
Alfred E. Burnouf
By Edgar Tate & Co.
Attorneys

UNITED STATES PATENT OFFICE.

ALFRED EDMOND BURNOUF, OF BONNIÈRES, FRANCE.

ROLLER-BEARING.

SPECIFICATION forming part of Letters Patent No. 643,890, dated February 20, 1900.

Application filed August 8, 1899. Serial No. 726,586. (No model.)

*To all whom it may concern:*

Be it known that I, ALFRED EDMOND BURNOUF, a citizen of the Republic of France, residing at Bonnières, in the Department of Seine-et-Oise, France, have invented certain new and useful Improvements in Roller-Bearings, of which the following is a specification, reference being had therein to the accompanying drawings.

This invention relates to roller-bearings; and the object thereof is to provide roller-bearings by the employment of which friction is materially decreased; and my invention consists in the construction and arrangement of parts, as hereinafter set forth in the specification, of which the accompanying drawings forms a part, in which like reference characters denote like parts in the several views, and in which—

Figure 1 is an end view of a bearing constructed according to my invention; Fig. 2, a vertical longitudinal section of the outer portions thereof, the inner portions being shown unsectioned; Fig. 3, a transverse longitudinal section of the inner portions thereof, the outer portions being shown unsectioned; Fig. 4, an end view of a detail of construction, and Fig. 5 a vertical transverse section of the entire bearing.

Referring to the drawings, I have shown at A a transmission-shaft, which may represent an axle, trunnion, or other device. Mounted upon the shaft A are a pair of collars E, provided with radial grooves D, in which are mounted the end bearings C of rollers B, which are arranged longitudinally of the shaft A. The rollers B bear upon the shaft A and also upon a divided sleeve M, which is cylindrically formed, interiorly and exteriorly, of the form of two truncated cones F F', set base to base. The bases of the opposite segments of the cones F F' are integrally connected by two crescent-shaped ribs G. The sleeve M is in one or two parts, and in the latter case their juncture O is at an angle with the shaft A. The ribs G terminate at their ends at the juncture of the two parts of the sleeve M. The divided sleeve M bears exteriorly against two journal-box members J and H, of which the former is stationary, and the latter is vertically adjustable, and said journal-box members are provided with a divided threaded ring L, which screws thereinto and is provided with an opening, through which the shaft A may be passed. An annular piece of wood, metal, or other material is fitted into this opening as a packing.

Upon motion of the shaft A the rollers B are revolved, and the collars D, furthermore, are free to revolve upon the shaft A, forming an exceptionally-frictionless bearing. The journal-box member K may be adjusted so as to tighten the bearing, by means of the ribs G. As the cones F and F' fit exteriorly against conical surfaces interior of the journal-box members K L, the parts of the bearings will be always maintained in true alinement.

Having fully described my invention, I claim as new and desire to secure by Letters Patent—

1. In a bearing, a plurality of rollers suitably arranged and between which a shaft may be passed, a divided sleeve passed about said rollers and being cylindrically formed interiorly and of the form of two cones exteriorly, a rib by means of which said cones are connected, said rib consisting of two members, each of which is crescent-shaped in form, and a pair of journal-box members in which said sleeve is mounted, and in connection with which sleeve one of said journal-box members operates to adjust said sleeve, substantially as shown and described.

2. A bearing of the class described, comprising a pair of journal-box members, one of which is adjustable and between which a shaft is passed, a pair of collars mounted on said shaft, a plurality of rollers journaled at their ends in said collars and arranged longitudinally of said shaft, a divided sleeve passed about said rollers and provided with a cylindrical inner surface and of the form of cones exteriorly, said cones being connected by a divided rib consisting of two parts, each of which is crescent-shaped in form, said cones operating in connection with the inner surfaces of said journal-box members, substantially as shown and described.

In testimony that I claim the foregoing as my invention I have signed my name, in presence of the subscribing witnesses, this 25th day of July, 1899.

ALFRED EDMOND BURNOUF.

Witnesses:
EDOUARD CARON,
THÉOPHILE DROUILLOT.